May 13, 1952     T. S. BARTLETT     2,596,359
FRICTION GEARING
Filed Sept. 13, 1949
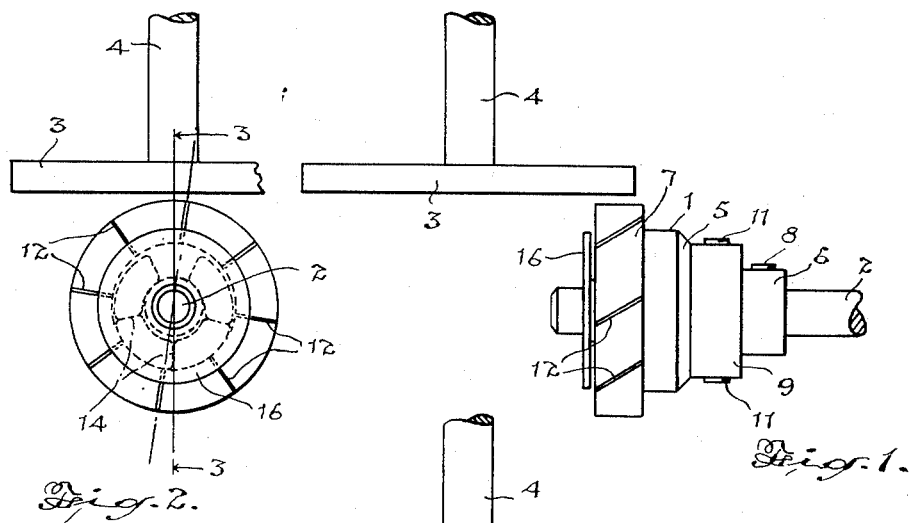
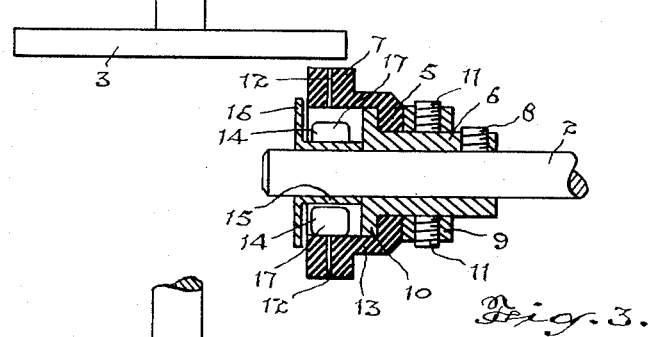
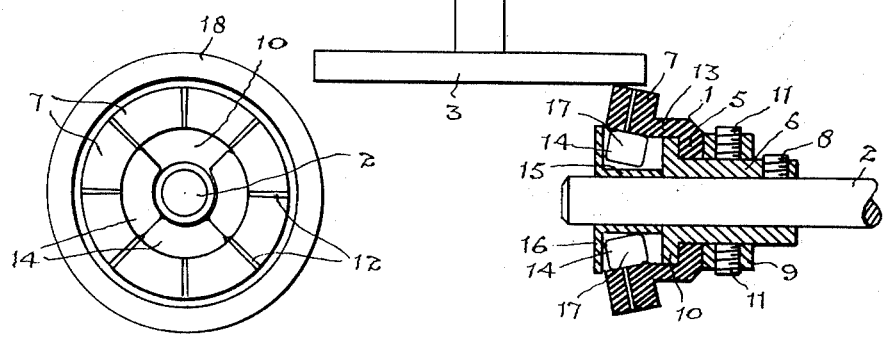
Inventor
Thomas S. Bartlett
by Douglas S. Johnson
atty Patented May 13, 1952

2,596,359

UNITED STATES PATENT OFFICE 2,596,359

FRICTION GEARING

Thomas Stephen Bartlett, London, Ontario, Canada

Application September 13, 1949, Serial No. 115,319
In Canada September 23, 1948

6 Claims. (Cl. 74—209)

This invention relates to a friction gearing and the principal object of the invention is to provide an exceedingly simple and inexpensive gearing which will automatically and efficiently connect the load to the driving source when the source has approached operating speed permitting the driving source to start under no load conditions.

A further and important object is to provide an efficient automatic gearing which will further serve as a flexible coupling between the drive and driven shafts and will permit the driven shaft to be operated at an angle to the drive shaft.

A still further and very important object is to provide a gearing which will serve additionally as a variable speed drive between the drive and driven shafts.

A still further object is to provide a gearing which will be noiseless in operation and which will have a low temperature rise under operation, and will have a long life operation.

A still further important object is to provide a gearing which will automatically compensate for any misalignment or non-trueness of the mounting of the drive and driven shafts.

The principal feature of the invention consists in providing a novel expanding gear member to be mounted on the drive shaft, the expanding member comprising a hub or disc of flexible resilient friction material formed with an annular peripheral flange integral therewith and having slots therein extending inwardly from the outer edge, said slotted flange forming under the action of centrifugal force an expanding friction annulus or collar adapted to move into driving engagement with a friction member on the shaft to be driven.

A further important feature consists in arranging weights within the friction annulus or collar to increase its expanding action under centrifugal force.

A still further feature consists in forming the slots in the hub flange at a helical angle to the axis of the hub portion to eliminate shear at the root of the slots and to provide a smooth, noiseless drive.

A still further feature consists in covering the weights within the expanding collar with a sound-silencing material to eliminate chattering therebetween during operation of the gearing.

Referring to the accompanying drawings,

Figure 1 is a side elevational view of a gearing constructed in accordance with my invention.

Figure 2 is an end elevational view of the gear mechanism of Figure 1.

Figure 3 is a vertical sectional view taken through the expanding gear member on the line 3—3 of Figure 2 and illustrating the gear member in its normal inoperative position.

Figure 4 is a view similar to Figure 3 but illustrating the manner in which the expanding gear member is expanded into engagement with its co-operating gear member under the action of centrifugal force.

Figure 5 is an end elevational view of an expanding gear member as illustrated in Figure 2, but showing it co-operating with a modified form of co-operating gear member to enable the gearing to function as a straight line drive flexible coupling.

Various forms of friction gearing have been proposed. Such devices have consisted essentially of weights operating in slots and expanding outwardly under centrifugal force to engage an enclosing collar fixed to the shaft to be driven.

These clutches have had numerous disadvantages, both in the forming thereof, and in their operation, being relatively expensive to manufacture and being noisy and relatively inefficient in operation over a wide range of speed.

Further the drive and the driven shafts have been required to be mounted in accurate alignment to give satisfactory power transfer.

The present invention has completely eliminated all of the above disadvantages by providing an exceedingly simple and inexpensive friction gearing, and at the same time providing a gearing which will eliminate the requirement for accurate alignment of the driving and driven shafts by forming in itself a flexible coupling between the shafts and enabling the shafts to be arranged at any angle one to the other.

In addition to providing a flexible coupling between the driving and the driven shaft my device further enables a variable drive to be obtained between the shafts as will be appreciated upon examination of the accompanying drawings.

With reference to the drawings, it will be seen that the device comprises essentially an expanding friction member 1 mounted on a drive shaft 2 which may be connected with any suitable power source, and a co-operating friction member 3 mounted on the shaft 4 to be driven.

As illustrated, particularly in Figures 3 and 4, the expanding member 1 is in the form of a cylinder having a hub portion 5 mounted on a flanged sleeve 6, and an integral enlarged flange portion 7 extending axially from the hub 5, and extending beyond the outer periphery thereon.

The member 1 as comprised by the hub portion 5 and integral flange portion 7 is formed of a flexible resilient friction material, preferably of hard rubber, or rubber composition or similar material.

It will be appreciated, therefore, that the flange portion 7 forms a friction annulus or collar which will deform or expand outwardly upon rotation of the drive shaft 2 and sleeve 6 secured thereto by the lock screw 8 and carrying the expanding member.

To lock the member 1 against rotation on its sleeve 6 a collar 9 mounted on the sleeve is provided. This collar is arranged to abut the hub portion 5 of the member 1 and to compress same between its inner wall and the flange 10 of the sleeve 6, the lock or set screws 11 serving to anchor the collar 9 in position.

Where the torque to be transmitted is relatively low and the expanding member 1 is made of relatively elastic material the flange 7 readily deforms, under the force of its own weight under the centrifugal force developed upon rotation of to drive shaft 2, from its normal form of Figure 3 to its form of Figure 4. This moves the outer periphery of the expanding flange 7 forming the expanding collar into frictional engagement with the co-operating friction member 3, shown in Figures 1 to 4 in the form of a disc.

In this manner a drive is established between the angularly arranged shafts 2 and 4, to transmit the required torque.

While it is possible to obtain a drive with the simple expanding member 1 described, having a relatively high elasticity, where any appreciable torque is to be transmitted such a simple, highly elastic expanding member is subjected to heavy wear and therefore in accordance with my invention I form the expanding member 1 of flexible, but relatively inelastic hard rubber, and I provide slots 12 in the flange portion 7 which extend through the flange inwardly from the outer end thereof and divide the flange or collar 7 into a plurality of individual segments connected by a narrow strip portion 13, with the hub portion 5. As shown particularly in Figure 1, the slots 12 are arranged at a helical angle relative to the axis of the hub portion 5 and the angle of these slots reduces any tendency of the rubber to shear at the roots thereof, or narrow strip portions 13, and provides a smooth, noiseless friction drive between the expanding member 1 and the co-operating friction member 3, which may also be formed of hard rubber, cast metal or other similar material.

Thus, by providing a hard, rubber, expanding member 1 and obtaining the essential quantities of wear and high coefficient of friction, I, at the same time provide a required degree of flexibility in the flange or friction collar 7 by provision of the slots 12 as explained, each segment as defined by the slots forming a free cantilever element to expand outwardly from a normal position, as shown in Figure 3, to the position of Figure 4 in friction engagement with the cooperating friction disc 3.

Where heavier loads still are to be transmitted I increase the friction drive obtained between the expanding member 1 and the member 3 by arranging weights 14 within the flange portion 7. These weights, as illustrated particularly in Figures 2 and 5, are arcuate in shape and they are loosely retained within the flange 7 by the retaining member 15, fitting the shaft 2, and formed with the flange 16, closing the outer, open end of the expanding member 1.

With the weights 14 arranged within the expanding collar or flange 7 on the member 1, for a given speed of rotation of the drive shaft 2, the force acting to expand the flange or collar segments outwardly is materially increased with a corresponding increase in frictional force between the two friction members 1 and 3.

To eliminate any noise or chattering between the weights 14 they may be provided with a coating or covering 17 of thin rubber or other suitable material.

With the expanding member 1 formed of relatively inelastic, flexible, resilient material the segments of the flange 7 will expand under the action of a centrifugal force acting both on the material forming the segments and on the weights and it will be appreciated that under such centrifugal force the generally cylindrical configuration of the member 1, as shown in Figure 3, will change to a frustro-conical shape, as shown in Figure 4, but the flange will not be deformed to an extent which will permit escape of the weights and same will be securely retained therein.

As shown in Figures 1 to 4 the shafts 2 and 4 are arranged at substantially right angles. It will be appreciated that with this arrangement the ratio of speed between the shafts can be readily changed as the position of the expanding member 1 can be moved relative the axis of the shaft 4 to engage the disc 3 at different radial distances, the clutch members 1 and 3 then functioning as a variable drive between the two shafts.

In the simple mechanism illustrated the adjustment of the relative position of the member 1 and the shaft 2 is controlled by the lockscrew 8 so that present adjustments are readily carried out.

However, it will be readily appreciated that, if desired, adjustment of the member 1 through the movement of the sleeve 6 can be readily accomplished during transmission of the torque to permit a continuously variable drive to be obtained, the friction surfaces of the clutch members 1 and 3 readily permitting this change in position of the member 1 to be carried out while the members are in frictional engagement.

With the element 1 formed of hard rubber a long wearing frictional surface is provided and with the slots 12 arranged in their helical relation the feed from one segment of the flange to the other, as defined by these slots, is such that the frictional force is gradually transmitted and the shearing forces tending to shear the segments from the hub are maintained at a minimum, acceptable value.

In addition, it is important to note that with the expanding member 1 rotating at operating speed it assumes the shape of the frustrum of a cone as shown in Figure 4, and as a result only a narrow portion of the periphery is required to be in engagement on the driven friction member 3 to effect an efficient drive.

With this relatively narrow portion engaging the friction member 3 scuffing of the rubber is reduced to a negligible amount and noise from such an effect is avoided. As a further result of this relatively narrow friction surface engagement the temperature rise of the rubber in the clutch members is relatively low, acting further to increase the life of the gearing.

From starting position the expanding member 1 is in its normal shape, as illustrated in Figures 1 and 3. It will be seen therefore, that no load is connected to the drive shaft 2, and a motor, of relatively low starting torque, may be utilized to operate the drive shaft 2. As the drive shaft begins to turn, and its speed increases the expanding flange or collar 7 of the member 1 will move outwardly, but same will not be forced into engagement with the cooperating clutch member 3 until the shaft 1 has reached a speed near its operating speed, at which time the load will be gradually and smoothly applied through my device. This feature is important in eliminating the requirement for drives of high starting torque by automatically connecting the load only after the drive shaft has built up speed to near its normal operating value.

While I have shown, in Figures 1 to 4, an arrangement for driving shafts arranged at substantially right angles it will be appreciated that my device may be employed for driving shafts at any desired angular relation.

In Figure 5 I illustrate the use of my gearing in forming the drive means between a substantially straight line drive. In this case the cooperating friction member 3, which is engaged by the expanding member 1, consists of an annular friction wheel 18 mounted on a shaft to be driven, and surrounding the expanding member 1 which is adapted to move outwardly upon expanding into engagement therewith.

It will be appreciated that with this type of straight line drive the gear members form a flexible coupling between the drive and the driven shafts. It is important to note, in this connection, that the drive between the gear members is independent of the trueness of mounting of the engaged friction disc or wheel, and accurate alignment of the driving and driven shafts is not required as the flexibility of the expanding member 1 compensates for any such inaccuracies.

In addition to the efficient and practical drive obtained with my gear device it will be appreciated that it may be very readily and inexpensively manufactured, the entire expanding member 1 being formed in a single moulding operation, with the remainder of the parts being readily formed and assembled.

What I claim as my invention is:

1. A friction gearing comprising a resilient flexible expanding friction member adapted to be mounted on a drive shaft, a second friction member adapted to be mounted on a shaft to be driven by said expanding member upon expansion thereof, said resilient expanding member comprising a hub portion having an annular laterally extending peripheral friction flange portion connected integral therewith by a flexing annulus of smaller diameter and lesser cross section than said friction flange portion, slots formed in said friction flange portion extending inwardly from the outer edge thereof to said connecting annulus, and dividing said flange into a plurality of segments having their base at said annulus and adapted to expand outwardly under centrifugal force to engage said second friction member.

2. A device as claimed in claim 1 in which weights are loosely arranged within said annular flange to move radially thereto and free from securement therewith to urge same outwardly under centrifugal force without restraint to flexing thereof, and means are provided to retain said weights within said flange.

3. A device as claimed in claim 1 in which the slots in said friction flange portion are arranged at a helical angle to the axis of said hub portion whereby shear forces at said reduced flexing annulus are minimized.

4. A friction gearing comprising an expanding friction member formed of a rubber material and adapted to be mounted on a drive shaft, a second friction member adapted to be mounted on a shaft to be driven by said expanding member upon expansion thereof, said expanding member comprising a hub portion, an enlarged annular flange portion connected integral with said hub portion by an annulus of a radius and cross section reduced from said annular flange portion and forming a flexible connection therefor, said flange portion forming an expandnig collar flexing from said annulus and being adapted to expand outwardly under centrifugal force to engage said second friction member, slots extending through said flange portion to said annulus and dividing the flange portion into a plurality of segments having their roots at said annulus and free to deform therefrom under application of external force to increase the expanding action of said flange under centrifugal force and a plurality of weights loosely arranged within said flange to move radially relative thereto and expand same without restraint to the flexible properties of said rubber material.

5. A device as claimed in claim 4 in which said shaft to be driven is arranged at an angle relative to said drive shaft and said second friction member comprises a disc of friction material to be engaged by said expanding member.

6. A friction gearing comprising an expanding friction member formed of resilient material and adapted to be mounted on a drive shaft, a second member adapted to be mounted on a shaft to be driven by said expanding member upon expansion thereof, said expanding member comprising a hub portion secured to said drive shaft and an enlarged annular flange portion concentric with said drive shaft and connected with said hub portion and having slots therein to define a plurality of segments free to flex outwardly of said hub as restrained solely by the inherent flexibility of said resilient material connecting same to said hub, a plurality of weights loosely arranged within said flange to move radially thereof, means retaining said weights from moving axially of said drive shaft within said flange, said weights being free to move radially of said drive shaft against said segments to expand said segmented flange outwardly against said second mentioned friction member to provide a surface contact therebetween as permitted by the stressing of said flexible material free of restraint from the material of said weights.

THOMAS STEPHEN BARTLETT.

REFERENCES CITED

The following references are of record in the file of this patent:

UNITED STATES PATENTS

| Number | Name | Date |
| --- | --- | --- |
| 987,640 | Molyneaux | Mar. 21, 1911 |
| 1,276,601 | Whiting | Aug. 20, 1918 |
| 1,710,174 | Manvillier | Apr. 23, 1929 |
| 2,283,325 | Fawick | May 9, 1942 |
| 2,350,810 | Pentz | June 6, 1944 |

FOREIGN PATENTS

| Number | Country | Date |
| --- | --- | --- |
| 119,791 | France | Apr. 16, 1927 |
| 404,162 | France | Nov. 24, 1909 |